(12) United States Patent
Faucher

(10) Patent No.: US 7,037,864 B2
(45) Date of Patent: *May 2, 2006

(54) INTEGRAL WATERPROOFING MEMBRANE

(76) Inventor: Denis Faucher, 3, chemin St-Achilée, Château-Richer Québec (CA), G0A 1N0

( * ) Notice: Subject to any disclaimer, the term of this patent is extended or adjusted under 35 U.S.C. 154(b) by 0 days.

This patent is subject to a terminal disclaimer.

(21) Appl. No.: 09/933,798

(22) Filed: Aug. 22, 2001

(65) Prior Publication Data

US 2003/0039853 A1 Feb. 27, 2003

(51) Int. Cl.
B32B 27/12 (2006.01)
B32B 27/04 (2006.01)

(52) U.S. Cl. .................. 442/86; 442/286; 442/295; 442/298; 442/394; 442/399; 442/412; 428/489; 428/490; 428/491; 52/408

(58) Field of Classification Search .............. 442/86, 442/286, 295, 298, 394, 399, 412; 428/489, 428/490, 491; 52/408
See application file for complete search history.

(56) References Cited

U.S. PATENT DOCUMENTS

| 4,357,377 A | * | 11/1982 | Yamamoto ............... 428/40.3 |
| 4,467,015 A | | 8/1984 | Clem |
| 4,481,245 A | | 11/1984 | Meynard |
| 4,837,095 A | | 6/1989 | Hageman |
| 4,869,037 A | | 9/1989 | Murphy |
| 5,254,661 A | | 10/1993 | Wilson |
| 5,326,798 A | | 7/1994 | Danese |
| 5,496,615 A | | 3/1996 | Bartlett et al. |
| 5,750,225 A | | 5/1998 | Petty |
| 5,773,123 A | | 6/1998 | Anwyll, Jr. |
| 5,843,522 A | | 12/1998 | Zanchetta et al. |
| 6,023,906 A | | 2/2000 | Folkersen |
| 6,235,365 B1 | | 5/2001 | Schaughency et al. |
| 6,238,766 B1 | | 5/2001 | Masset et al. |
| 6,279,284 B1 | | 8/2001 | Moras |
| 2003/0054127 A1 | * | 3/2003 | Heifetz ..................... 428/40.1 |

FOREIGN PATENT DOCUMENTS

| CA | 2275985 | | 3/2000 |
| DE | 28 40 599 | | 3/1980 |
| DE | 2 099 474 | | 12/1982 |
| DE | 9002221 U | | 6/1990 |
| DE | 90 02 221 | | 6/1990 |
| EP | 0260494 | | 3/1988 |
| EP | 0 260 494 | | 3/1988 |
| EP | 0315239 | * | 5/1989 |
| GB | 1326894 | | 8/1973 |

OTHER PUBLICATIONS

Merriam Webster's Collegiate Dictionary, 10$^{th}$ edition, 1997, p. 1256.*

* cited by examiner

Primary Examiner—Ula Ruddock

(57) ABSTRACT

An integrated waterproofing membrane is provided which comprises a performed waterproofing material layer covered on one major face with a adherent impervious material liner, and on the other major face with an adherent porous support sheet. The integral waterproofing membrane of the present invention allows for application without releasing of a layer even using a warming source for the application on a surface to be waterproofed.

7 Claims, 2 Drawing Sheets

INTEGRAL WATERPROOFING MEMBRANE

TECHNICAL FIELD

The present invention relates to an integrated waterproofing membrane which does not require removal of a release sheet liner before application on a surface to be protected from weather conditions. More particularly, the waterproofing membrane of the present invention integrates a permeable sheet liner allowing passage of a contiguous impervious composition.

BACKGROUND OF THE INVENTION

Many related art water devices exist for covering or protecting surfaces from water penetration. These include waterproof coverings different surfaces and coatings. Similarly there are numerous protective courses which are applied over the waterproof surface to protect it.

On the other hand, it is known that bitumen-based membranes are used for waterproofing in construction. Such membranes normally feature a reinforcement made of non-woven polyester cloth or of a layer of reinforced glass such as fiberglass. One of the membrane surfaces is coated with small slate flakes of various colors, similar to granules, for protection against ultraviolet rays.

The users of these types of membranes currently face serious problems when trying to seal together contiguous membranes because of the relatively complex steps that must be carried out to connect the two contiguous or adjacent ends. Of course, if an effective seal is not attained, the membrane system will leak and not achieve its very purpose.

Most of membranes known in the art for waterproofing a structure or a surface need the release of one part, such as a non-adherent sheet on one face of a impervious layer before application on the surface.

Waterproofing membranes are generally obtained in sheets of 3, 4 or 5 mm thickness and, if total or partial adhesion to the support is required, they can be applied either by means of a propane-gas torch, which by liquefying the bituminous mass makes it adherent to the support, or by using hot air-blown bitumen which acts as an adhesive.

However, while membranes based on bitumen modified with styrene-butanediene-styrene (SBS) yield good results with both methods (with preference for the air-blown bitumen method, due to some limitations of the SBS membrane with the torch method, such as excessive softening which almost always prevents rapid and easy application of the membrane, especially in summer), it is recognized that polyolefin-based membranes generally yield the best results only with the flame method; this especially because otherwise, in the course of time, adhesion tends to decrease due to the forming of an oily layer between the air-blown bitumen and the membrane which causes its separation in the course of time.

The problems of hardening the handling during application of waterproofing membranes because of the release of paper or because of the use of a torch demonstrate that there is still an important need in the art for new waterproofing membranes.

SUMMARY OF THE INVENTION

One object of the present invention is to provide an integrated waterproofing membrane comprising a waterproofing material layer capable to transude through a sheet of fibers or a sheet of paper, having opposite first and second sides, the first side being coated with a non transudent impervious surfacing material which is adherent to the waterproofing material and the second side being coated with an adherent support sheet composed of material allowing passage of the waterproofing material through the adherent support sheet to enter in contact with a surface on which the integrated waterproofing membrane is applied, the adherent support sheet being capable also of allowing passage therethrough of an adhesive material previously applied thereon or on a surface on which the integrated waterproofing membrane is to be applied.

The waterproofing material layer may be composed of transudent material selected from the group consisting of a bitumen, a polymer, and a resin, wherein the bitumen can be polymer-modified asphalts.

The thickness waterproofing material layer may be between 0.5 to 4 mm.

In accordance with the present invention there is provided an waterproofing membrane in which an impervious surfacing material is composed a non transudent material that may be selected from the group consisting of a polymer, a resin, a plastic, a metal, a polyester, a polypropylene, a polybutyrene, a polyimide, a polycarbonate, a polyamide, a polyethylene, a polystyrene, a polyvinylchloride, a fluoroplastic, a sulfone polymer, and a polyvinylidene chloride. Also, the support sheet may be composed of paper, fabric, fiber network, or mixture thereof.

The waterproofing material may further comprise up to 50% by weight of a filler.

The waterproofing material may comprise between 50 to 100% of bitumen, and up to 50% by weight of at least one copolymer. The mixture of the bitumen and a copolymer generally forms 100% of the waterproofing material. The copolymer can be composed of ethylene, propylene, butene, derivative or mixture thereof.

For the purpose of the present invention the following terms are defined below.

The term "bitumen" as used herein is intended to mean residue from atmospheric distillation of crude oil or of a mixture thereof with a slightly oxidized product. The softening point of the various types varies from 36° C. to 140° C., and the penetration number is generally comprised between 40 to 350 dmm; bitumen which have a penetration number comprised between 60 to 220 dmm and a softening point comprised between 60° C. and 120° C. are preferably used for modification with polymers. It is furthermore possible to use mixture of various types of bitumen, and the properties of the bitumen can be modified by adding mineral oils, fatty substances, chemical agents which make it impenetrable to roots, and others.

The term "copolymer" as used herein is intended to mean an elastic polymer which may be formed with ethylene, polyester, polypropylene, polybutyrene, polyimide, polycarbonate, polyamide, polyethylene, polystyrene, polyvinylchloride, fluoroplastics, sulfone polymers, polyvinylidene chloride, butene, derivatives or mixtures thereof. The ratios of polymers used in preparing a mixture may vary depending of the physical and chemical properties needed in a waterproofing material. For example, a waterproofing material according to the present invention may comprise between 5 to 15% by weight of copolymers. Also, for example, one type of mixture of copolymers, which can be used in the waterproofing material, may comprises between 25 to 70% propylene, 20 to 70% butene and 0 to 15% ethylene.

The term "transudent" as used herein is intended to mean the capacity or property of a mater to transude, to exude, to excrete, to transpire, to diffuse, or to pass through pores or interstices of a layer, as a sheet of paper for example. A mater capable to transude, slowly or rapidly, may be liquid, viscous, or pasty, and may have a physical state, meaning that the transudent mater may be more or less viscous for example, depending of the ambient temperature. A non transudent mater is relatively solid, and does not transude, exude, excrete, transpire, diffuse, or pass through pores or interstices.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
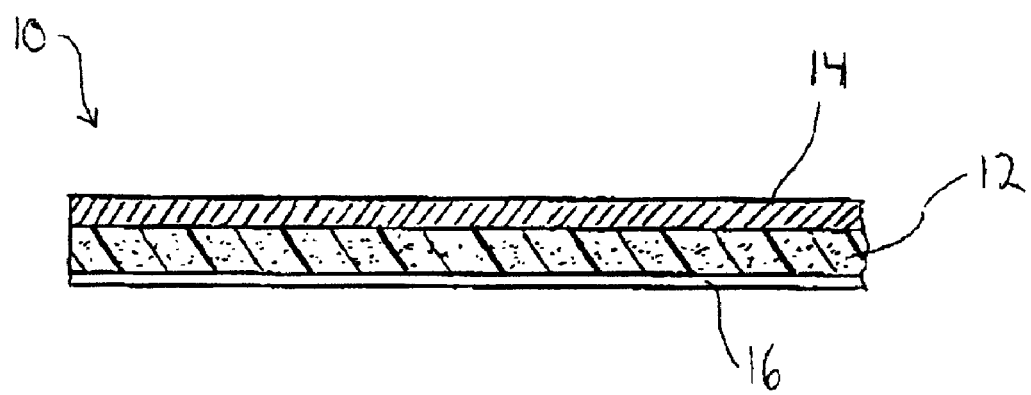
FIG. 1 illustrates a cross-section view of an integral waterproofing membrane constructed in accordance with one embodiment of the present invention.

As illustrated in FIG. 1, an integral waterproofing membrane 10 constructed in accordance with one embodiment of the present invention includes a waterproofing material layer 12, an impervious surfacing material 14 adhered to an integrated adherent support sheet 16.

Figure 2:
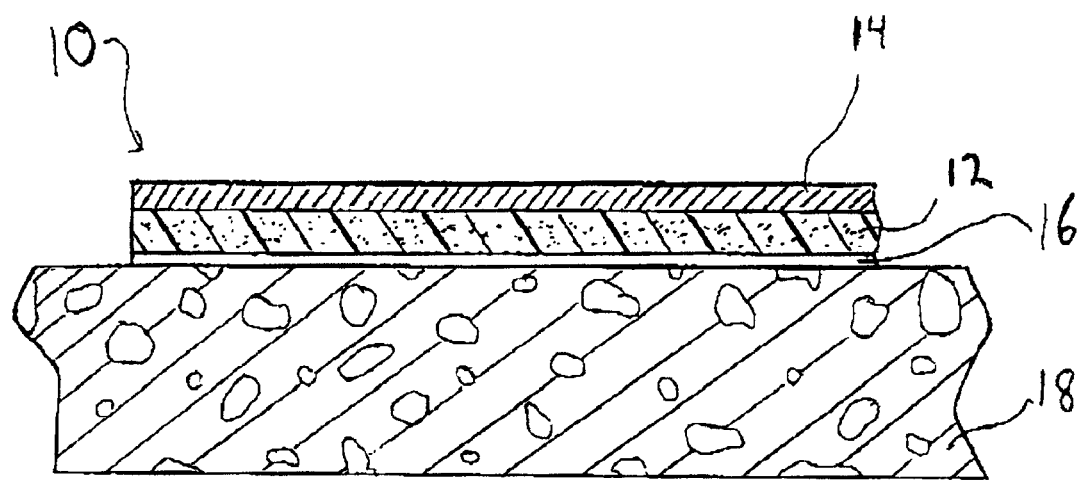
FIG. 2 illustrates a cross-section view of an integral waterproofing membrane adhered to a surface that is to be waterproofed.

Referring to FIG. 2, the integral waterproofing membrane 10 of the invention is applied on a surface 18 which can be composed of concrete, wood or other mater to be waterproofed.

In one embodiment of the present invention, there is provided a waterproofing membrane comprising an integrated support sheet on one side of a waterproofing material layer, and porous in manner to allow the waterproofing material to pass through the integrated support sheet, and an impervious material on the other side of the waterproofing material layer.

One particular embodiment of the present invention is to provide an integrated waterproofing membrane in which is integrated a non-released adherent support sheet. Surprisingly, it has been observed that the use of such a support sheet which has not to be released during applying the waterproofing membrane on a surface to be waterproofed, renders the integrated waterproofing membrane more resistant to stretching, easier to handle and apply, and allows for stability and efficiency of waterproofing to provide to a surface. Securing the integrated waterproofing membrane on a surface to be waterproofed may require only the use of a tape adhesive on both sides. Alternatively, under the action of warming, the waterproofing material reaches a temperature above its softening point, transpires or transudes through the support sheet, and allows adhesion of the integral waterproofing membrane on the surface on which it is applied. An adhesive material, such as glue, may also be applied on the support sheet or a surface before application of the integrated waterproofing membrane on this surface.

The support sheet may be composed of paper, such as Kraft paper, having a thickness of between 0.2 to 3 mm, and a density of between 20 to 60 pounds. Preferably, the support sheet is composed of paper having density of 36 to 44 pounds. Alternatively, the support sheet may be composed of different fabrics known in the art. The fabric can be composed of cotton, synthetic mater, polyester, nylon, or any other mater that can be processed in a fabric porous enough to allow passage of a contiguous waterproofing material through it. The porosity of the support sheet may be calibrated or adjusted to allow transudation of a waterproofing material by one side of it, and transudation of glue by the other side of it in manner that a contact between the waterproofing material and the glue is done inside the support sheet.

The resulting waterproofing membrane may therefore be used to prepare rolled up jumbo rolls. The rolls that can be prepared with the waterproofing membrane of the present invention can be of size, in length and width, superior to what it is possible to other membranes or methods known in the art.

The waterproofing material possesses a coating temperature at which it can be coated on an impervious or impermeable film, sheet or plaque as a viscous liquid. The waterproofing material may alternatively be coated, for example, when being below a flowing temperature of between about 80° C. to 115° C., on another film or support sheet which is permeable to the waterproofing material when the temperature of the waterproofing material is above its softening temperature, which may be for example of 100° C. The softening and flowing temperatures of the waterproofing material may vary depending on its composition.

The waterproofing material layer of the present invention is preferably composed of a polymer-modified bitumen such as a styrene-butanediene-styrene (SBS) block polymer, and can include one or more fillers such as limestone or the like to provide the desired consistency and physical properties for use in the integrated membrane. The types of filler commonly used in this type of mixture are various. Among them, it is possible to include slate powder, calcium carbonate, talc, kaolin and other compounds which are well-known in the art. The purpose of the use of filler is to increase the stability of the mixture and reduce. Preferably, the filler used may have such a fineness as to pass through a 75-micron screen, although fillers which pass to an extent through a 60-micron (200-mesh) screen may also be used.

The present invention utilizes a wide variety of impervious materials to form an impermeable film on one side of the waterproofing membrane of the present invention. Generally, the film formed by an impervious material should be substantially impermeable to water and, based on the waterproofing membrane's end use, capable of stretching with movement of the surface to which it is ultimately applied. The impervious material can be formed of natural rubber or of a synthetic organic polymer such as polyethylene, polyvinylchloride, fluoroplastics, sulfone polymers, polyvinylidene, polypropylene or other polyolefin, a polyamide, a polyester, for example a polyethylene terephthalate, a polyurethane, a polyvinyl halide, such as a polyvinyl chloride and copolymers thereof, such as a polyvinyl chloride and vinylidene chloride, a synthetic rubber, such as polychloroprene or butyl rubber, regenerated cellulose, cellulose, cellulose ethers or cellulose esters.

Another embodiment of the present invention is to provide an integral waterproofing membrane in which the film formed with the impervious material can be a film in the form of a solid sheet, cellular film or woven and non-woven fabrics which are sufficiently non-porous to restrict the flow of the hot bituminous composition therethrough when applied. The film may also be composed of metal in manner to form a metal sheet.

The waterproofing membrane of the present invention is used to make waterproof structures or surfaces constructed of materials such as wood or concrete which are water-penetrable either inherently or as a result of imperfections such as cracks or pores. Rendering a surface or structure waterproof as used herein means eliminating the ability of water to penetrate the surface or structure.

The integral waterproofing membrane of the present invention may be considered also as a weather proofing membrane which is designed to be laminated to most common building cheating material such as gypsum boards, perlite boards, wood fiber boards, or plywood.

The embodiment(s) of the invention described above is (are) intended to be exemplary only. The scope of the invention is therefore intended to be limited solely by the scope of the appended claims.

I claim:

1. A waterproofing membrane to be applied on a substrate comprising a middle layer of bitumen based waterproofing material having opposite first and second sides and having a thickness of from 0.5 to 4 mm; layer of impervious surfacing material directly adhered to said first side of the middle layer; a support sheet layer made of a porous material and having a first and second surface with the first surface directly adhered to the second side of the middle layer by means of the waterproofing material transuding partially into the pores of the support sheet; and an adhesive coating to be initially transuded into the pores of the support sheet and to be adhered to the substrate.

2. The waterproofing membrane of claim 1, wherein said bitumen is a polymer-modified asphalt.

3. The waterproofing membrane of claim 2, wherein said waterproofing material further comprises up to 40% by weight of a filler.

4. The waterproofing membrane of claim 1, wherein amid impervious surfacing material in a material that is incapable of transuding and is selected from the group consisting of a polymer, a resin, a plastic, a metal, a polyester, a polypropylene, a polybutylene, a polyimide, a polycarbonate, a polyamide, a polyethylene, a polystyrene, a polyvinylchloride, a fluoroplastic, a sulfone polymer, and a polyvinylidene chloride.

5. The waterproofing membrane of claim 1, wherein said support sheet is composed of fiber, said fiber comprising Kraft paper, a fabric, or a mixture thereof.

6. The waterproofing membrane of claim 1, wherein said waterproofing material comprises between 50 to 100% of bitumen, and up to 50% by weight of at least one copolymer, wherein combination of said bitumen and said copolymer forms 100% of said waterproofing material.

7. The waterproofing membrane of claim 6, wherein said copolymer is styrene-butadiene-styrene, ethylene, propylene, butene, a derivative or a mixture thereof.

* * * * *